United States Patent [19]
Ell et al.

[11] 3,921,190
[45] Nov. 18, 1975

[54] PHOTOGRAPHIC PROCESSING FLUID APPLICATOR

[75] Inventors: Robert J. Ell, Malden, Mass.; Frank W. Knight, Jr., Salem, N.H.

[73] Assignee: Polaroid Corporation, Cambridge, Mass.

[22] Filed: Jan. 14, 1974

[21] Appl. No.: 433,216

[52] U.S. Cl. ............... 354/317; 222/484; 222/541; 352/78; 352/130; 354/78; 354/88
[51] Int. Cl. ............................................. G03d 5/00
[58] Field of Search .......... 354/88, 78, 317; 352/78, 352/72, 130; 222/541, 484

[56] References Cited
UNITED STATES PATENTS

| | | | |
|---|---|---|---|
| 2,898,015 | 8/1959 | Borah | 222/484 |
| 3,217,950 | 11/1965 | Goodson | 222/484 |
| 3,339,788 | 9/1967 | Lipske | 222/541 X |
| 3,778,140 | 12/1973 | Land | 352/78 X |

Primary Examiner—Richard L. Moses
Attorney, Agent, or Firm—Karl H. Hormann

[57] ABSTRACT

A processing fluid receptacle of a processing fluid applicator for use in a photographic film cassette capable of processing latent images on exposed film without requiring removal of the film from the cassette. The receptacle has an opening which is initially sealed by a flexible web member provided with a vent. The vent is opened at a time relating to the time of removal of the sealing web from the receptacle to assure proper release of fluid contained therein into the applicator.

12 Claims, 3 Drawing Figures

PHOTOGRAPHIC PROCESSING FLUID APPLICATOR

BACKGROUND OF THE INVENTION

The subject invention relates to photographic apparatus and, more particularly, to a processing fluid receptacle of an applicator for treating a strip of photographic film material. The applicator is for particular use in a photographic film cassette of the kind capable of processing a strip of film contained therein without requiring removal of the film from the cassette.

DESCRIPTION OF THE PRIOR ART

The popularity of amateur motion pictures and the availability of apparatus for making "home movies" have been increasing significantly in recent years to the point where they constitute a large portion of the photographic industry. Customarily, such apparatus and the film material used in them are such that film processing is accomplished in facilities removed from the photographer and without his control. The time between exposure of the films and their development, including the forwarding of the films from the photographer to the processing plant and their subsequent return, is sometimes a source of considerable frustration to the photographer, and it would thus be desirable to provide motion picture equipment and film suitable for operation by the photographer for purposes not only of exposure, but also of processing for immediate viewing.

Such equipment and film have recently been proposed in a number of U.S. patents; see, for instance, U.S. Pat. No. 3,748,994. That patent teaches a photographic cassette having a strip of film therein which, after exposure, may be processed within the cassette by the photographer in apparatus, such as a motion picture projector, capable of operating on the film, without necessitating its removal from the cassette, in a certain sequence. Processing of the film is accomplished by a processing station housed within the cassette and rendered operative by the apparatus. The processing station comprises an applicator engaging the film during the processing operation for depositing thereon a layer of processing fluid to render visible, by the well-known diffusion transfer process, latent images recorded on the film. The applicator is connected to a receptacle, sometimes called a pod, which initially contains a processing fluid and which is provided with a cover which may be removed automatically at an appropriate time during the operating sequence of the apparatus so that the fluid is released to the applicator for coating onto the film. As shown in U.S. Pat. No. 3,748,994, the cover of the receptacle comprises a flexible web or tape attached at one end of the receptacle to seal an aperture provided therein and connected at its other end to means in the cassette for moving the film, the arrangement being such that when the apparatus is in its proper operating sequence, it will cause the tape to be removed from its position in which it seals the aperture. The aperture is of a rectangular form, the short margins of which are positioned normal to the longitudinal axis of the film. Removal of the tape occurs by a peeling motion commencing at one of the short margins of the aperture. The tape is made of a material inert to processing fluid and possesses a tensile strength greater than the force exerted on it during its removal from the receptacle. The processing fluid initially contained in the receptacle and released into the applicator by removal of the peeling tape from the receptacle is of a relatively low viscosity which impedes rapid flow into the applicator. In some instances, it may even prevent all the fluid from leaving the receptacle into the applicator for deposit on the film strip to be developed.

BRIEF SUMMARY OF THE INVENTION

It is a general object of the present invention to provide for an improved applicator for treating a strip of photographic film material.

Another object of the invention resides in providing an applicator for treating a strip of photographic film material for use with a film processing station in a photographic film cassette of the kind capable of processing a film contained therein.

A more specific object of the invention relates to providing, in a motion picture film processing fluid applicator, an improved seal between its fluid receptacle and applicator chamber.

Yet another object of the invention is to provide an aperture in a film processing fluid receptacle permitting faultless removal of the sealing tape.

In the accomplishment of these and other objects, the invention provides for an applicator for treating a strip of photographic film material, comprising an applicator means for applying a processing fluid to the strip of film, a container for such fluid, operatively connected to said applicator means, comprising a hollow receptacle provided in one of the surfaces with an opening, web means comprising a strip of flexible material having first and second sections, the first section being releasably attached to said one surface to seal said opening and having an aperture positioned near one end of the first section in an area thereof overlying said opening, the second section being folded over said first section at the other end, and vent means comprising a strip of flexible material releasably attached at one end to said first section to seal said aperture therein and attached at its other end to said second section, the arrangement being such that a pulling force exerted on the free end of said second section causes said first section to be peeled off said surface and said one end of said vent means to be removed from said aperture.

In a more specific embodiment of the invention, a photographic film cassette is provided which comprises a housing, a strip of initially unexposed photographic film movably mounted in the housing, the housing being provided with a station configured for exposing the film, means for processing the film within the housing including an applicator means for applying a processing fluid to the strip of film and comprising a container for such fluid, operatively connected to said applicator means, comprising a hollow receptacle provided in one of its surfaces with an opening, web means comprising a strip of flexible material having first and second sections, the first section being releasably attached to said one surface to seal said opening and having an aperture positioned near one end of said first section in an area thereof overlying said opening, the second section being folded over said first section at the other end, and vent means comprising a strip of flexible material releasably attached at one end to said first section to seal said aperture therein and attached at its other end to said second section, the arrangement being such that a pulling force exerted on the free end of said second section causes said first section to be peeled off said surface and said one end of said vent means to be removed from said aperture.

BRIEF DESCRIPTION OF THE DRAWINGS

These and other objects are hereinafter described, by way of example, with reference to the appended drawings in which.

DETAILED DESCRIPTION OF THE INVENTION

Figure 1:
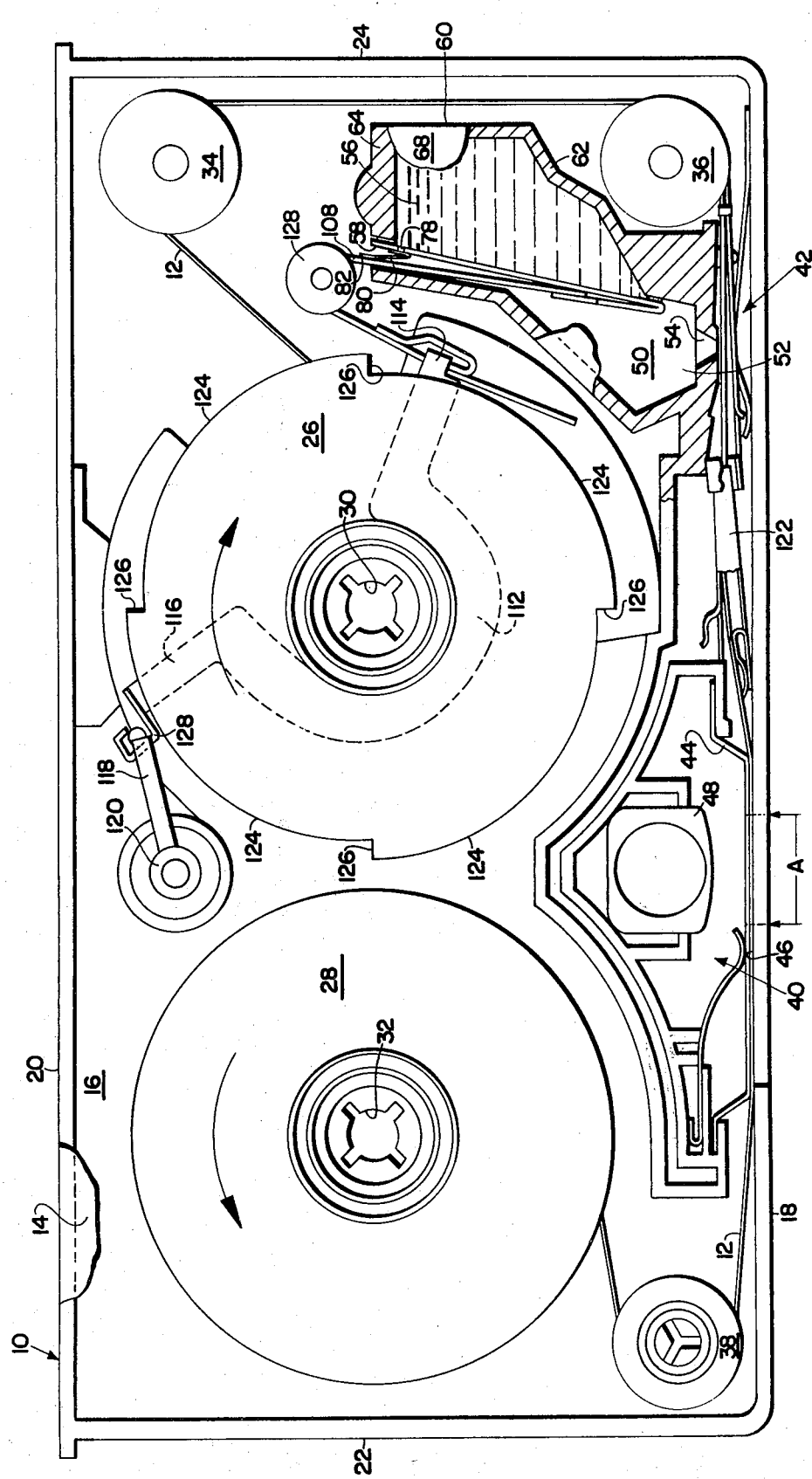
FIG. 1 is a planar view, with parts broken away for clarity, of a motion picture film cassette having a novel seal for the processing fluid receptacle.

A motion picture film cassette 10 is shown which comprises a housing preferably made of material impervious to actinic radiation for purposes of preventing unwanted exposure of a strip of film 12 contained therein. The housing is of generally parallelepiped configuration having two opposing side walls 14 and 16, a forward wall 18, a rear wall 20, and opposing end walls 22 and 24. The film 12 is mounted within the cassette 10 for movement between a supply reel 26 on which it is initially coiled before its exposure in a camera (not shown) and a take-up reel 28 onto which it is wound during such exposure and at other times as described infra. Opposite ends of the film are fastened to the reels 26 and 28. Both reels 26 and 28 are appropriately journaled in a common plane within the cassette 10 as, e.g., on studs (not shown) protruding from one of the side walls 14 or 16. Suitably positioned apertures in the other side wall render driving hubs 30 and 32 of the reels 26 and 28, respectively, accessible to drive means provided in a camera (not shown) or projector (not shown) for rotatably driving the reels 26 and 28 unidirectionally so that a number of operations, such as exposure, processing and projecting as well as winding, may be performed on the film 12 in a predetermined sequence. The film 12, in moving from one reel to the other by virtue of their rotation, is guided along a path including idler rolls 34, 36 and 38 rotatably mounted on side wall 16 through operating stations 40 and 42 provided in the cassette 10. At least one of the idler rolls, here 38, is selectively engageable through an aperture (not shown) in side wall 14 by extrinsic means mounted in the camera or projector for imparting a tension to the film appropriate to assure motion of the film 12 at uniform linear speed.

Operating station 40 serves a double purpose. It is a film exposure station permitting incremental sections of the film 12 to be exposed as it is moved within a camera. For this purpose, it is provided with an aperture indicated to be positioned in the forward wall within an area marked A. The aperture, during exposure of the film, is in registry with the optical path of the taking lens of the camera. A spring loaded apertured pressure plate 44 and a cooperating guide surface 46 provided on the inner surface of forward wall 18 position the film at the focal point of the lens of the camera.

Station 40 also serves as a projecting station when the cassette 10 is mounted in a projector. To this end, it is provided with a prism 48 in registry with an aperture in one of the side walls 14 or 16 and the aperture in area A of forward wall 18. Light from a projection lamp (not shown) entering the prism 48 through the aperture in the side wall is refracted by the prism 48 and redirected through the film 12 and the aperture in wall 18 to project an image recorded on the film on a projection screen (not shown).

The other operating station 42 is a film processing station which permits developing latent images recorded on the film 12 without removing the film 12 from the cassette 10. Such development is accomplished during a predetermined step in the operating sequence of a projector (not shown) into which the cassette is loaded after film exposure in the camera. The projector may operate fully automatically and may be equipped with sensors to determine, when a cassette 10 is inserted into it, whether or not processing of the film 12 is required, before the operating sequence of the projector is switched to a projecting mode. To this end, the sensors in the projector may be responsive to various means or conditions of the cassette 10. An example of such sensors has been described in U.S. Application Ser. No. 384,382 (Case 4,919).

The processing station 42 comprises an applicator 50 suitable for depositing a layer of uniform thickness of processing fluid onto a light sensitized emulsion on the film 12. The applicator 50 has a housing 52 providing a chamber and mounted within the cassette 10 adjacent supply reel 26. It is provided with a nozzle 54 through which the processing fluid is deposited onto the film 12. The housing may be filled with a wicking material for uniform flow of the processing fluid. This fluid is initially contained in a receptacle 56 which is in operative engagement with the applicator 50 and is provided with a seal 58, such as a flexible web or tape, to prevent unwanted escape of the processing fluid from the receptacle 56 into the applicator 50.

Figure 2:
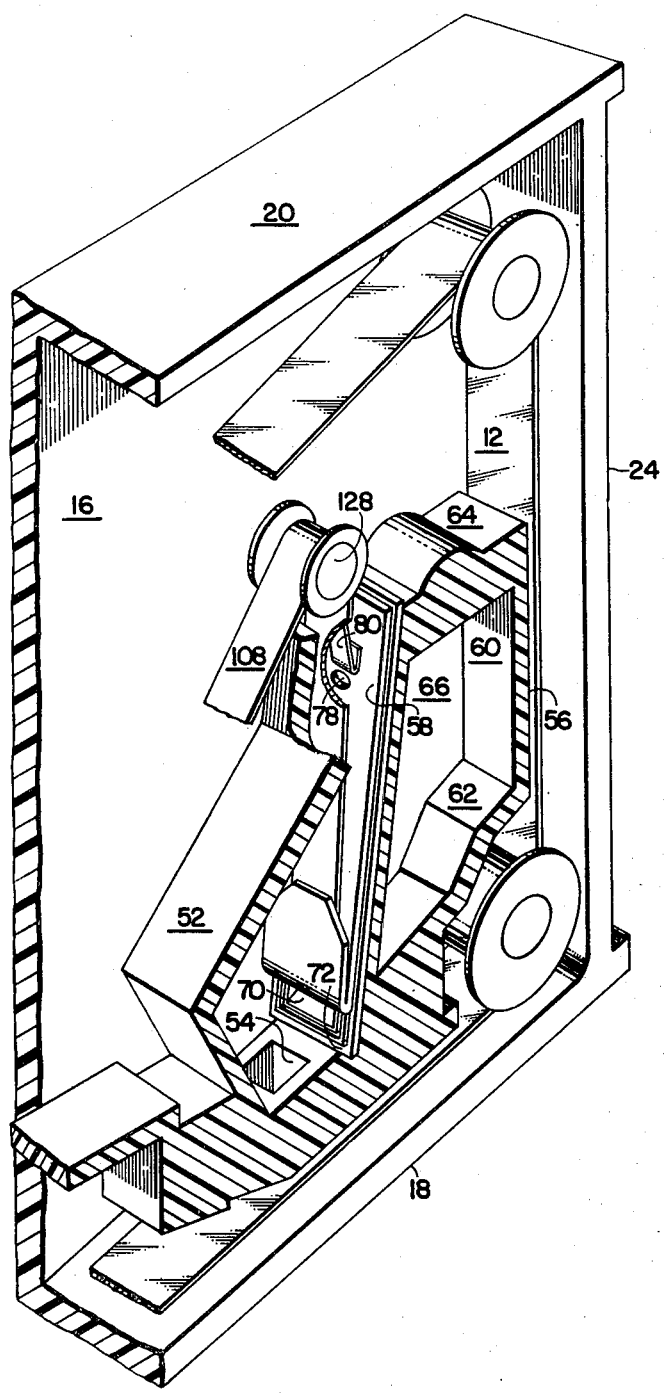
FIG. 2 is a perspective view on an enlarged scale, and partly in section, of the seal shown in FIG. 1.
Figure 3:
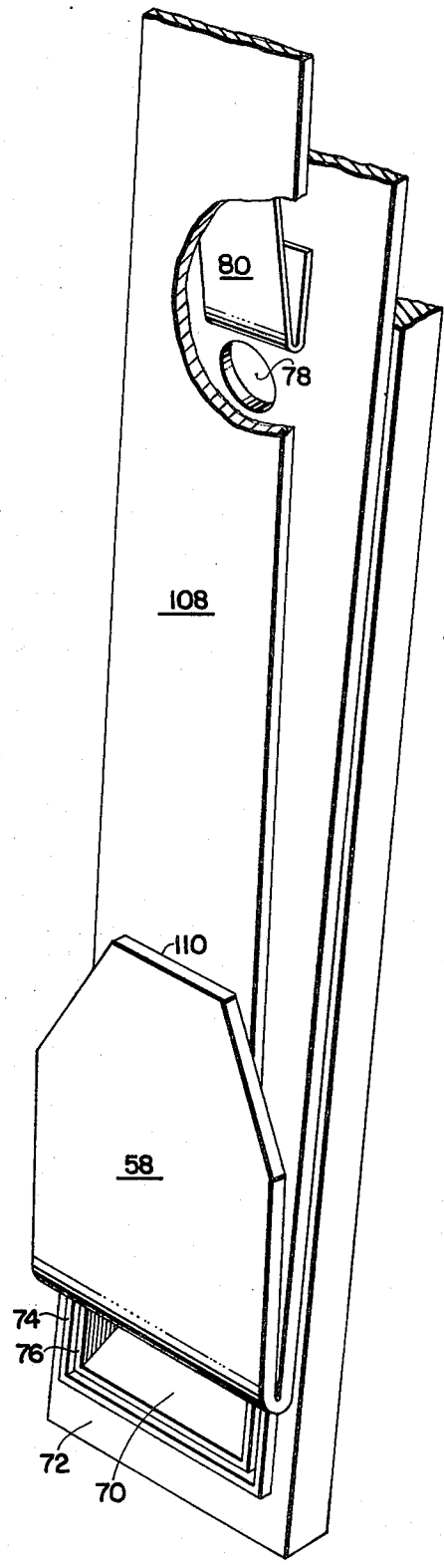
FIG. 3 is a perspective view on an enlarged scale of the novel sealing tape and vent.

The receptacle 56, as shown in FIGs. 1 and 2, comprises a bottom wall 60, opposing end walls 62 and 64, and side walls 66 and 68 forming together a cavity of sufficient volume to accommodate a quantity of processing fluid required for coating substantially the entire length of film 12. End walls 62 and 64 and side walls 66 and 68 embrace a generally rectangular aperture 70. The aperture 70 may be surrounded by a flange 72 which may, as shown in FIG. 3, be provided with protruding lips 74 and 76. The lips 74 and 76 serve releasably to seal the web 58 over the aperture 70. It will, however, be obvious to those skilled in the art that the lips 74 and 76 need not be present; the web 58 may be attached to the flange 72 directly. The seal or web 58 is of a material inert to processing fluid of the kind useful for processing exposed photographic film. Certain kinds of leaded plastic foil have been found to exhibit the required properties. The web 58 must not only be inert to the processing fluid, but it must also possess a tensile strength in excess of the strength of the bond between it and the flange 72 or lips 74 and 76 and greater than the forces exerted on it, as explained infra, to remove it therefrom.

As shown in FIGS. 2 and 3, the web 58 adjacent that end of the aperture 70 proximate end wall 64 is provided with an aperture 78. The aperture 78 has been depicted to have a circular shape, yet other shapes, e.g., square, polyangular or elliptical, may also be employed. The aperture 78 is initially releasably sealed by a strip 80 of flexible material. Preferably, the strip 80 is of the same material as the web 58. The releasable seal of the aperture 78 is maintained substantially as long as the web 58 is maintained in sealing relationship with the aperture 70. Sealing of the web 58 in overlying relationship to the aperture 70 of the receptacle 56 and of the strip 80 to the web 58 may be a matter of any one of suitable adhesives, or preferably it is accomplished by heat fusion, high frequency welding, or any other technique known in the art. The seals should be of sufficient strength to prevent rupturing except by pulling force deliberately exerted on the sealing strip 58 in the manner described infra.

There are provided in the cassette 10 means for selectively severing the sealing tape or web 58 from the receptacle 56 by a peeling action. Peeling of the web 58 off the receptacle 56 also results in peeling of the strip 80 off the web 58 to open the aperture or vent 78. To this end, the sealing tape 58 is attached at its lower end, as seen in FIGS. 1 and 2, to a draw tongue 108 comprising a flexible tape. One end of the tongue 108 is, for purposes to be described infra, releasably fastened to the sealing tape 58, the other end being connected to an actuating lever 112 (FIG. 1). The lever 112 is generally U-shaped and is provided with flaring extensions 114 and 116. The knee of lever 112 is mounted for limited rotation about the hub 30 of supply reel 26. Extension 114 is fastened to the draw tongue 108, and extension 116 is connected to a link 118, the latter being provided for rotating the lever 112 in a direction effecting peeling of sealing tape 58 from the receptacle 56.

The link 118 is rigidly mounted on a stub 120 which may be mounted for axial displacement in the side wall 16 in a direction normal to its plane. The axial displacement of the stub 120 is accomplished by transducing means provided in the projector (not shown) at a time when sequencing means thereof signal that the cassette 10 mounted therein is in proper condition for processing the film. Such sequencing means may be controlled by physical irregularities, such as hooks or protrusions, deliberately provided at or near one or both ends of the film 12 so that when the irregularity engages a sensor, as for instance, a channel guide 122 provided in the cassette 10, the transducing means which are in contact with the sensor 122 cause the stub 120 with the attached link 118 to be pushed away from the side wall 16.

As shown in FIG. 1, the periphery of reel 26 is provided with a plurality of camming surfaces 124 each ending in an abrupt step 126. While when the stub 120 is in its retracted position, the reel 26 may rotate freely, forward movement of the stub 120 will result in a cam follower 128 secured to the end of lever extension 116 being pushed into the rotational path of reel 26, thereby engaging one of the camming surfaces 124. This, in turn, will cause the lever 112 to be pivoted in a clockwise direction when the reel 26 subsequent to the forward thrust of stub 120 is rotated in that direction. In so doing, it is disconnected from link 118. Such pivoting of the lever 112 causes the tongue 108 to be moved downwardly as seen in FIG. 1. In so moving, the tongue 108 pulls the sealing strip 58 upwardly, upward motion thereof being the result of the tongue 108 extending around an idler roll 128 journaled in side wall 16. The sealing strip 58 is thus peeled off the flange 72 or lips 74, 76, as the case may be, thus opening the aperture 70 of the receptacle 56.

As illustrated in the drawings, whilst one end of the strip 80 is releasably attached to the web 58 in a manner appropriate to seal the aperture or vent 78 (FIG. 1), the other end 82 of the strip 80 is attached to the draw tongue 108. The arrangement is such that the strip 80 is folded over itself for purposes of reversing its extensional direction. The attachment of end 82 to the draw tongue is stronger than the seal of the strip 80 to the web 58. The end 82 of the strip 80 extending in the direction of contemplated motion of the draw tongue 108, as discussed supra, it is apparent that such motion will result in motion of the strip 80 and ultimate peeling thereof off the web 58 away from the aperture or vent 78. The time at which such peeling of the strip 80 commences relative to the commencement of the peeling of the web 58 away from the aperture 70 depends on the amount of relative slack between the draw tongue 108 and the strip 80. Hence, if the draw tongue 108 and the strip 80 are initially under equal tension, opening of the aperture 70 and of the vent 78 will occur substantially simulatenously. If the strip is initially taut and the draw tongue 108 is slack, pulling of the tongue 108 will result in opening of the vent 78 before the aperture 70. Initial tautness of the tongue 108 and slack in the strip 80 will, of course, have the opposite result.

It will be appreciated that the sequence in which the aperture 70 and the vent 78 are opened is a matter of choice depending, inter alia, on such parameters as the viscosity of the processing fluid or the angular velocity of lever 112.

Those skilled in the art will realize the advantages wrought by the present invention. The vent 78 when opened will permit air to enter the receptacle 56, thus preventing the building up of vacuum pressure and, hence, will assure a free flow of processing fluid from the receptacle 56 into the applicator and thence to the nozzle 54 for deposit onto the film 12 to develop the latent images recorded thereon.

The invention disclosed is not limited to the specific construction depicted, but variations thereof are fully within its ambit.

We claim:

1. An applicator for treating a strip of photographic film material, comprising:

applicator means for applying a processing fluid to the strip of film;

a container for such fluid, operatively connected to said applicator means, comprising a hollow receptacle provided in one of its surfaces with an opening;

web means comprising a strip of flexible material having first and second sections, the first section being releasably attached to said one surface to seal said opening and having an aperture positioned near one end of said first section in an area thereof overlying said opening, the second section being folded over said first section at the other end; and vent means comprising a strip of flexible material releasably attached at one end to said first section to seal said aperture therein and attached at its other end to said second section;

the arrangement being such that a pulling force exerted on the free end of said second section causes said first section to be peeled off said surface and said one end of said vent means to be removed from said aperture.

2. The applicator of claim 1, in which said second section and said strip are under equal tension.

3. The applicator of claim 1, in which said second section is under less tension than said strip.

4. The applicator of claim 1, in which said second section is under greater tension than said strip.

5. A photographic film cassette, comprising:
a housing;
a strip of initially unexposed photographic film movably mounted in said housing, said housing being provided with a station configured for exposing the film;
means for processing the film within said housing including an applicator means for applying a processing fluid to said strip of film and comprising a container for said fluid operatively connected to said applicator means and comprising a hollow receptacle provided in one of its surfaces with an opening;
web means comprising a strip of flexible material having first and second sections, the first section being releasably attached to said one surface to seal said opening and having an aperture positioned near one end of said first section in an area thereof overlying said opening, the second section being folded over said first section at the other end; and
vent means comprising a strip of flexible material releasably attached at one end to said first section to seal said aperture therein and attached at its other end to said section;
the arrangement being such that a pulling force exerted on the free end of said second section causes said first section to be peeled off said surface and said one end of said vent means to be removed from said aperture.

6. The cassette of claim 5, in which said second section and said strip are under equal tension.

7. The cassette of claim 5, in which said second section is under less tension than said strip.

8. The cassette of claim 5, in which said second section is under greater tension than said strip.

9. An applicator for treating a strip of photographic film material, comprising:
applicator means for receiving and applying a processing fluid to the strip of film;
a container for such fluid, operatively connected to said applicator means, comprising a hollow receptacle provided in one of its surfaces with an opening;
web means for releasably sealing said container, said web means comprising a strip of flexible material having a tear-section releasably attached to said one surface to seal said opening, the arrangement being such that a pulling force exerted on the free end of said tear-strip so as to displace said tear-strip causes said section to be peeled off said surface so as to open said container; and
vent means for venting said container just prior to or during the opening thereof responsive to the displacement of said tear-strip.

10. The applicator of claim 9, wherein said tear-strip comprises a first section releasably attached to said one surface of said container and a second section folded at one end over said first section, and said vent means includes means coupling said second section to the said first section proximate the other end thereof so that a pulling force exerted on the free end of said second section to displace said tear-strip causes said first section to be peeled off said surface starting at said one end of said first section and a venting of the other end of said first section.

11. A photographic film cassette for developing an exposed strip of photographic film material, said cassette comprising:
a housing configured for retaining a strip of photographic film material;
applicator means for receiving and applying a processing fluid to such film strip;
a reservoir for releasably containing a supply of such processing fluid, said reservoir being operatively connected to said applicator means so as to deliver such fluid thereto upon release of such fluid; and
means for releasing such fluid from said reservoir including means for opening said reservoir at a given point to permit a flow of said fluid to said applicator means and means for venting said reservoir above said given point substantially simultaneously with said releasing.

12. Photographic film cassette of claim 11 wherein said means for releasing comprises a web having at least three functional portions, the arrangement being such that one portion serves to release said fluid, one portion serves to vent said reservoir, and one portion serves to exert a kinetic force on the other two of said portions.

* * * * *